(12) United States Patent
Channapragada et al.

(10) Patent No.: US 12,052,469 B2
(45) Date of Patent: *Jul. 30, 2024

(54) SYSTEMS AND METHODS FOR GENERATING A WATCH SCHEDULE AND COMPRESSED CONTENT TO COMPLETE A SERIES BEFORE EXPIRATION

(71) Applicant: Rovi Guides, Inc., San Jose, CA (US)

(72) Inventors: Srikanth Channapragada, Karnataka (IN); Vikram Makam Gupta, Karnataka (IN); Reda Harb, Issaquah, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,115

(22) Filed: Jun. 13, 2023

(65) Prior Publication Data

US 2023/0328321 A1    Oct. 12, 2023

Related U.S. Application Data

(63) Continuation of application No. 17/981,722, filed on Nov. 7, 2022, now Pat. No. 11,722,733, which is a continuation of application No. 17/465,640, filed on Sep. 2, 2021, now Pat. No. 11,523,184.

(51) Int. Cl.
| | |
|---|---|
| H04N 21/458 | (2011.01) |
| H04N 21/435 | (2011.01) |
| H04N 21/4402 | (2011.01) |
| H04N 21/442 | (2011.01) |
| H04N 21/45 | (2011.01) |
| H04N 21/482 | (2011.01) |
| H04N 21/845 | (2011.01) |

(52) U.S. Cl.
CPC ......... *H04N 21/458* (2013.01); *H04N 21/435* (2013.01); *H04N 21/44029* (2013.01); *H04N 21/44204* (2013.01); *H04N 21/4532* (2013.01); *H04N 21/4825* (2013.01); *H04N 21/8456* (2013.01)

(58) Field of Classification Search
CPC .............. H04N 21/458; H04N 21/435; H04N 21/44029; H04N 21/44204; H04N 21/4532; H04N 21/4825; H04N 21/8456; H04N 21/44226; H04N 21/4436; H04N 21/4627; H04N 21/4882; H04N 21/8355; H04N 21/84; H04N 21/4325

See application file for complete search history.

(56) References Cited

U.S. PATENT DOCUMENTS

| | | |
|---|---|---|
| 11,523,184 B1 | 12/2022 | Channapragada et al. |
| 2010/0023964 A1 | 1/2010 | Basso et al. |
| 2015/0350746 A1 | 12/2015 | Tomita |
| 2023/0063895 A1 | 3/2023 | Channapragada et al. |

FOREIGN PATENT DOCUMENTS

WO    2018005800 A1    1/2018

*Primary Examiner* — Anthony Bantamoi
(74) *Attorney, Agent, or Firm* — Haley Guiliano LLP

(57) ABSTRACT

Systems and methods are described herein for generating a watch schedule and compressed series for a user for a series that is expected to become unavailable. Availability data indicating when a content series will become unavailable is received and compared to user progression habits. If the content series will become unavailable before the user will complete it, a watch schedule may be offered to the user. If the user subsequently falls behind on this watch schedule, a compressed version of the content series may be offered to the user.

20 Claims, 9 Drawing Sheets

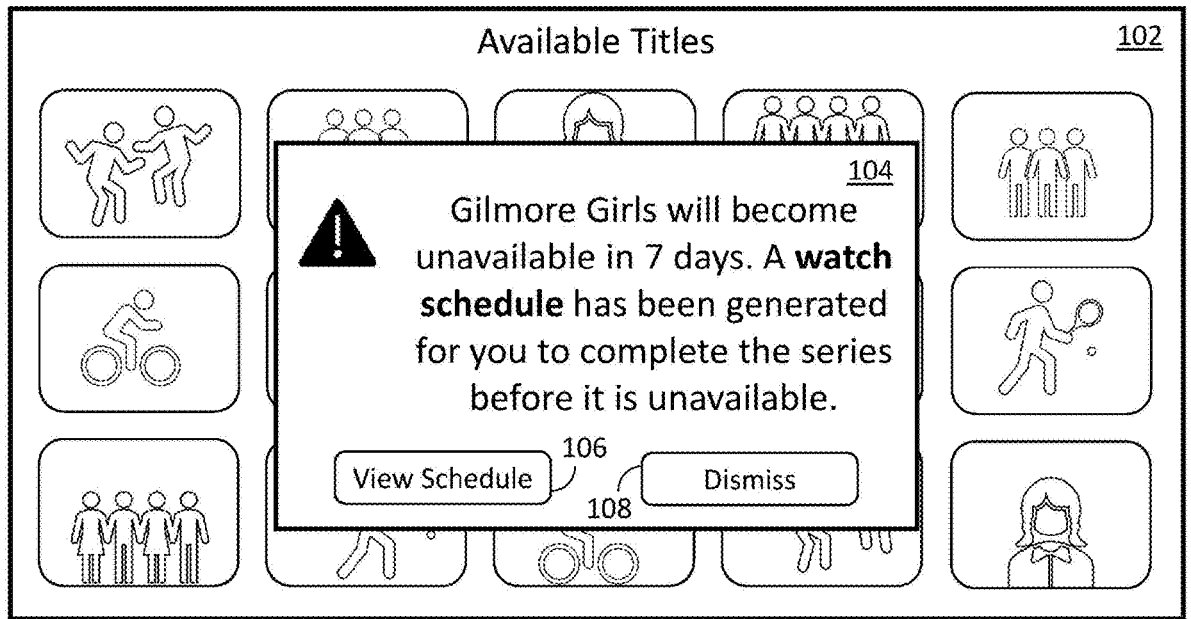

| Full Content 600 |||||||
|---|---|---|---|---|---|---|
| Segment 1 | Segment 2 | Segment 3 | Segment 4 | Segment 5 | Segment 6 | Segment 7 |
| Title Card 602 | Recap 604 | Scene 1 606 | Scene 2 608 | Scene 3 610 | Scene 4 612 | Credits 614 |

| Compressed Content 616 ||||
|---|---|---|---|
| Segment 3 | Segment 4 | Segment 5 | Segment 6 |
| Scene 1 618 | Scene 2 620 | Scene 3 622 | Scene 4 624 |

```
802 ──┐┌─ Content_ID: 106a453fd6e2 {
804 ──┐│   Title: Gilmore Girls;                              800
806 ──┐│   Sources: {Netflix, Hulu, Tubi};
808 ──┐│   Series: TRUE;
810 ──┐│   Type: TV;
812 ──┐│   BeginDateTime:  {1/1/2020 00:00:00 UTC,
       │                    6/1/2019 12:00:00 UTC,
       │                    5/15/2021 00:00:00 UTC};
814 ──┐│   ExpireDateTime: {12/31/2021 23:59:59 UTC,
       │                    9/30/2021 00:00:00 UTC,
       │                    5/14/2023 23:59:59 UTC};
816 ──┐│   SeriesMembers {045979ae4564, 0879ecdf5dea, ... };
       │ }
       │
       │ Content_ID: 15e423a7800f {
       │   Title: Iron Man;                                   818
820 ──┐│   Sources: {Disney+};
822 ──┐│   Series: TRUE;
       │   Type: Movie;
       │   BeginDateTime: {6/1/2018 08:00:00 UTC};
       │   ExpireDateTime: {10/15/2021 12:00:00 UTC};
       │   SeriesMembers {4e568a12def5, 045168790a4e, ... };
       │ }
       │
       │ Content_ID: 4cd45962300e {
       │   Title: The Martian;                                824
       │   Sources: {Amazon Prime Video};
826 ──┐│   Series: FALSE;
       │   Type: Movie;
       │   BeginDateTime: {1/1/2021 00:00:00 UTC};
       │   ExpireDateTime: {9/30/2023 18:00:00 UTC};
       │ }
```

FIG. 8

SYSTEMS AND METHODS FOR GENERATING A WATCH SCHEDULE AND COMPRESSED CONTENT TO COMPLETE A SERIES BEFORE EXPIRATION

CROSS-REFERENCE TO RELATED APPLICATIONS

This application is a continuation of U.S. patent application Ser. No. 17/981,722, filed Nov. 7, 2022, which is a continuation of U.S. patent application Ser. No. 17/465,640, now U.S. Pat. No. 11,523,184, filed Sep. 2, 2021. The disclosures of which are hereby incorporated by reference herein in their entireties.

BACKGROUND

The present disclosure is directed to enabling a user to complete a series before it becomes unavailable. More particularly, the present disclosure is directed to providing a watch schedule and a condensed version of a content series to a user.

SUMMARY

It is very common for over-the-top (OTT) providers and other media sources (e.g., Netflix) to constantly remove content from their service to comply with licensing agreements. Content catalogues of such OTT services get updated very frequently. Some OTT services inform their subscribers ahead of time that a content item will be leaving soon. For example, Netflix displays a "Last day to watch on Netflix" message on the "Details" page of the content item. It is also very common for users to watch content via various providers (e.g., Netflix, Tubi, Hulu, Disney+, etc.) and/or add content items to a wish list for later consumption. Services that simply notify users that a given content item will not be available in a certain number of days are not very helpful to the user. At any given time, the user's wish list and/or recommended content on any given service could include many content items. Therefore, in conventional media consumption systems, when a user is watching a series that is scheduled to become unavailable, they may not realize that it will become unavailable before they finish the whole series. Even if they realize that the series will expire, they must manually figure out how much to watch each day in order to finish it on time or attempt to binge-watch all remaining parts of the series. If they do not watch enough, they may not be able to finish the whole series on time. Users may waste some of what time they have watching ancillary segments such as the title card, credits, or openers that are irrelevant to the content instead of watching more relevant portions of the content. Additionally, there may be scenes related to plotlines that they are not interested in that users may spend time watching. In some cases, a user may, upon learning that a series will become unavailable soon, want to learn how they can complete the series before it becomes unavailable. Additionally, they may want a compressed version of the series that allows them to complete the series before it will become unavailable.

Systems and methods are described herein for generating a watch schedule and compressed series for a user for a series that is expected to become unavailable. Availability data indicating when a content series will become unavailable is received and compared to user progression habits. If the content series will likely become unavailable before the user will complete it, a watch schedule may be offered to the user. If the user subsequently falls behind on this watch schedule, a compressed version of the content series may be offered to the user.

The compressed version of the content series can be produced by removing segments of the content from the series. In some embodiments, the segments to be removed may be ancillary segments from each content item in the content series. These ancillary segments may include a title card, credits, theme song, any other suitable repetitive segment of content, and/or any suitable combination thereof. In some embodiments, the segments to be removed may be segments related to plotlines determined not to be of interest to the user. These segments may be identified by, for example, comparing metadata of the segments to user profile data. The user profile data may include favorite actors, characters, genres, scene locations, any other suitable preferences, and/or any suitable combination thereof.

The watch schedule will be generated for the user upon determining that the user will likely not complete the series before it becomes unavailable. This is determined by comparing user progression habits to the availability data. The user progression habits may include how far into the series the user is, how much content they typically consume at once, what days they consume content, any other relevant information regarding the user's content consumption, and/or any combination thereof. The availability data may include when a series will expire, when the user will travel somewhere that either the series or the service is not available, when the series will become available on the source again, when the series will become available on another source, any other suitable information regarding the availability, and/or any combination thereof.

The availability data compared to the user progression habits may come from one or more sources. In some embodiments, if the content series will become available or continue to be available from another source after it expires from the one the user is currently consuming content from, a recommendation to continue to watch the series from the other source may be presented to the user. In some suitable approaches, the user may be offered this recommendation along with a deep link to the new source to continue the content series from their current watch position. In some embodiments, it may be determined that the content series will become available or continue to be available from another source that the user is not subscribed to. A recommendation to subscribe to the new source may be presented to the user. In some suitable approaches, the user may be offered this recommendation along with a deep link to the new source to continue the content series from their current watch position after subscribing. As used herein, a "deep link" is a hyperlink that points to a specific page or resource on a destination server, rather than to a generic landing page or homepage.

In some embodiments, a central service tracks all the sources (e.g., third-party applications) that a user utilizes to consume content. Such tracking is easily achieved through APIs offered by the various sources. In another embodiment, the central service is unique to a specific video application (e.g., Netflix). Since the central service is aware of the content items that the user consumed and/or is in the process of consuming, it generates a list of content items that will not be available through the various sources. Such list is based on the user's profile, recent consumption behavior, and the various content items' availability windows. Similarly, some streaming apps inform users ahead of time about what new content will be added in the future (e.g., coming next month or next week, etc.). The central service takes such data into consideration (if available) in order to generate the list of content items that are recommended to be consumed before they become unavailable.

In some embodiments, content items that are leaving a first source but are currently available or will be available in the future on a second source are not recommended for immediate viewing. Such content items will be flagged for the user when they are available on the second source. For example, if a user added the movie "Black Widow" to "My List" on Netflix, and the movie will not be available for streaming at the end of the month, the user will not necessarily be alerted if it is determined that this movie will be available or is already available on a second source. The same movie is re-recommended to the user by the central service, when it is no longer available on Netflix, for consumption via the second source. For example, a notification or text element can be displayed to inform the user that they missed the movie on Netflix, but can still watch it on Disney+. In some embodiments, the central service may indicate to the user to that a content item is no longer available via a first source, but is available via a second source and prompts the user to download an app for the second source. Such recommendation can be made when the user actively searches for the content (e.g., user is expecting to find the movie since he or she added to their playlist or watchlist).

When generating a watch schedule, priority may be given to content items where there is no metadata regarding their upcoming availability, and when such content items align with the user's recent viewing behavior on various platforms. For example, the user's recent consumption profile might show that the user has been watching various Marvel movies on different sources. For example, in the past 3 weeks, the user watched "Thor," "Ant-Man," and "Black Panther." The central service might prioritize other related movies (e.g., "Thor: Ragnarok," "Doctor Strange," etc.) over other movies on the user's watchlist or the items on the user's recommendation list when it is unknown if these movies will be available anytime soon through other sources that the user utilizes or use often.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which:

FIG. 1 shows an illustrative example of a media application that generates a watch schedule based on an upcoming expiration of content, in accordance with some embodiments of the disclosure;

FIG. 2 shows an illustrative example of a watch schedule generated based on the number of episodes left to be consumed in a content series prior to expiration of the content series, in accordance with some embodiments of the disclosure;

FIG. 3 shows an illustrative example of a watch schedule generated based on amount of time in a content series left to be consumed prior to expiration of the content series, in accordance with some embodiments of the disclosure;

FIG. 8 shows an illustrative example of metadata for content items and content series, in accordance with some embodiments of the disclosure.

DETAILED DESCRIPTION

Figure 4:
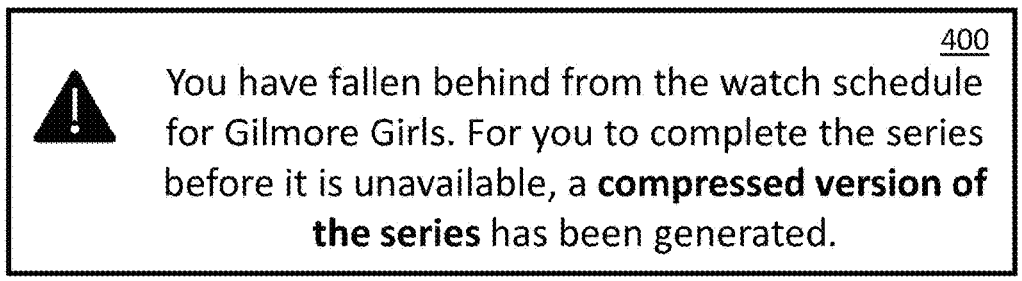
FIG. 4 shows an illustrative example of notification generated by a media application that generates a compressed version of a series based on an upcoming expiration of content, in accordance with some embodiments of the disclosure.

FIG. 1 shows an illustrative example of a media application that generates a watch schedule based on an upcoming expiration of content, in accordance with some embodiments of the disclosure. When accessing content, e.g., on user device 100, a content selection screen 102 is displayed. The media application may access a list of content items or content series that the user is currently watching but has not yet completed. The media application may also retrieve availability data identifying an expiration date and time for each of these content items or content series. The media application determines an amount of content remaining for the user to consume for each content item or content series. Based on these amounts and on the identified expiration date and time for each content item or content series, the media application determines whether the user will be able to complete consumption of each content item or content series prior to their respective expirations. If the media application determines that the user will not be able to complete consumption of a content item or content series prior to its expiration, an alert 104 may be displayed to the user. Alert 104 contains a notification that a content series, e.g., "Gilmore Girls," will become unavailable in a certain amount of time, e.g., seven days. The content series may become unavailable because it is being removed from the media source or from the user's particular subscription to the media source, the user will be travelling outside of an available location for either the content series or the media source, or any other suitable reason for the content series to be unavailable, and/or any combination thereof. Alert 104 also notifies the user that a watch schedule has been generated. If the user adheres to the watch schedule, the user will be able to complete consumption of the content prior to its expiration. Alert 104 may further include interactive elements such as buttons 106 and 108. Selection of button 106 presents the user with the generated watch schedule for their review. The user may also choose to dismiss alert 104 using button 108 if they do not wish to view the watch schedule at this time, or are no longer interested in the content item or content series. In some embodiments, the media application may also place a menu item or other interactive element to view the watch schedule in association with the content item or content series, e.g., "Gilmore Girls." For example, after generating the watch schedule, the user may return to the media application and select to continue watching "Gilmore Girls." Several options may normally be displayed to the user when selecting a content item or content series, such as "Watch now," "Add to watchlist," "Start over," etc. If a watch schedule has been generated for "Gilmore Girls," an additional option to view the watch schedule may also be displayed.

In some cases, there may be more than one content item or content series the user is consuming that will expire soon. In such cases, more than one watch schedule, or a watch schedule that indicates amounts of content from each content item or content series, may by generated. Priority is given to the content item or content series that will expire soonest, with the watch schedule indicating consumption of more content from the content item or content series expiring soonest than for the content item or content series expiring latest.

FIGS. 2 and 3 show illustrative examples of watch schedules. FIG. 2 shows a watch schedule 200 generated based on number of episodes left to be consumed in a content series prior to expiration of the content series, in accordance with some embodiments of the disclosure. Watch schedule 200 shows the user how they can complete the content series before it expires. For example, if the content will expire after seven days, watch schedule 200 may show the user at what rate they must consume the content in order to complete the series before it becomes unavailable. Watch schedule 200 includes seven sections 202-214 corresponding to the next seven days during which the user will have to watch the indicated amount of content on each day in order to complete the content series before its expiration. Watch schedule 200 shows how many episodes of the series the user must consume each day in order to finish the series before it becomes unavailable. In some embodiments, the content may be split among the days of watch schedule 200 evenly. In some embodiments, the content may be unevenly split among the days. For example, in watch schedule 200, there are three episodes scheduled for days 2, 3, and 7 as shown by 204, 206, and 214. There are two episodes scheduled for days 1, 4, and 6 as shown by 202, 208, and 212 and only one episode for day 5 as shown by 210. In watch schedule 300, there are only 15 minutes scheduled for day 6 as shown by 312, 42 minutes scheduled for days 2 and 3 as shown by 304 and 306, 120 minutes schedule for days 1, 4, and 7 as shown by 302, 308, and 314, and 230 minutes for day 5 as shown by 310. In some suitable approaches, the user profile data may be used to dynamically split the content to have more content scheduled on days when the user typically watches more content. The number of episodes indicated for each day of watch schedule 200 may be calculated based on user profile data, such as user watch-time history. If the user historically watched more content on weekends, the media application may generate a watch schedule that indicates more episodes on weekends than on weekdays. For example, day 2 and day 3 of watch schedule 200 (204 and 206) may correspond to Saturday and Sunday, respectively. The media application may therefore schedule the user to watch more episodes on those days than on the other five days of watch schedule 200. In some suitable approaches, if there is a certain amount of time scheduled that will lead to only a few minutes of an episode left over, the system will dynamically allocate extra time to complete the episode. FIG. 3 shows a watch schedule 300, which shows a user how much time of the series the user must consume each day in order to finish the series before it becomes unavailable. Watch schedule 300 may be generated in a similar manner to watch schedule 200 and may similarly account for user watch habits to calculate amounts of time for each day.

FIG. 4 shows an illustrative example of a notification generated by a media application that generates a compressed version of a series based on an upcoming expiration of content, in accordance with some embodiments of the disclosure. Once a watch schedule has been generated for a particular content series, the user's consumption of the content series is monitored and compared with the watch schedule to determine if the user is adhering to the watch schedule. If the user has not been adhering to the watch schedule, an alert 400 displays a notification that the user has fallen behind on their watch schedule for the content series, e.g., "Gilmore Girls." In response to the user falling behind, a compressed version of the series may be generated. In some embodiments, the compressed version of the series may remove ancillary segments from the content item. These ancillary segments may include a title card, credits, theme song, any other suitable repetitive segment of content, and/or any suitable combination thereof. In some embodiments, the compressed version of the series may remove segments of content not of interest to the user. For example, user profile data may indicate a preference for a particular character or storyline. Alternatively or additionally, user profile data may indicate that the user habitually skips certain types of portions of the content series. The media application may remove those segments to generate the compressed version of the content.

In some embodiments, as part of implementing a compressed version of the content, the media application may implement a recommended "watch-mode" algorithm that suggests a best mode/pace to consume the content based on what the media source (i.e., the media source that hosts the content) supports. Additionally, the content type (e.g., series), amount of unconsumed content related to the item (including number of episodes if the item is of the type TV Series), and availability window are all considered. For example, some services/video players might support autoskip intros and credits while others might support skipping chapters of the content. Some services might allow users to skip scenes based on genre (e.g., skip politics scenes). The capabilities of the video player can be used to recommend the best consumption mode for high-priority content. The suggested watch-mode can be accepted or rejected by the user. In some embodiments, the content is processed to be compatible with the supported mode. For example, while a video player has the logic to skip over a scene in response to a key press or command, metadata must be provided or available to the player to perform such function, e.g., start time, end time of the scene, etc. As such, a personalized auto-chaptering algorithm can be relied upon to segment the content to make it easier to skip scenes and to support the watch-mode. This is especially useful when content licensing agreements prevent the auto summarization of content such as movies or TV shows.

The auto-chaptering of content can occur via a dedicated cloud service that generates metadata that is later utilized by the player to enable a given watch-mode. For example, such metadata can be communicated via a sidecar (e.g., a JSON, XML, etc.) file or directly integrated or written into the playlist or manifest sent to the player. Such data allows the player to present the skip functionality or even auto-skip scenes (if content licensing allows). The content licensing parameter can also be signaled, if available. Streaming media manifests (e.g., an HLS playlist) can contain chapter metadata in JSON format (e.g., via a URI) that is referenced by a specific tag (EXT-X-SESSION—DATA) in the main or master playlist. Each chapter can be associated with multiple types of data, e.g., start time/duration, title(s), description, image(s) and other items. Determining which sections are recommended to the user to skip or for the player to auto-skip is dependent on the content item, content item type, availability window, number of other items related to a given content item (e.g., one item can be episode 11, another is episode 12, and episode 13 is the series finale), and user's profile, including preferences for plots, actors, genre, sub-genres, etc. Such profile is created and refined/updated over time as a user consumes content. Machine learning (ML) algorithms that are based on video analysis can generate the metadata specific to a user (personalized) to generate the JSON files. For example, existing ML models can be used to extract metadata about scenes that meet a certain a specific criterion (e.g., aligned with the user's preferences). Such metadata is used to augment the playback session with recommended skips, and auto-skips of chaptered content. User actions are also collected during any watch-mode to further refine the user's profile/preferences. For example, actions taken while watching episode 11 in a watch-mode can be used to automatically make decisions regarding what to include and/or skip in episode 12 of the same TV series. In one embodiment, the user can skip any chapter (when chapter metadata is available) at first in order to prime the algorithm so that it can start suggesting what to skip. Metadata can also be explicitly generated to assist in skipping or auto-skipping introductions and/or credits (e.g., if the TV series or movies do not have available metadata for the player to recognize intros/end credits).

Figure 5:
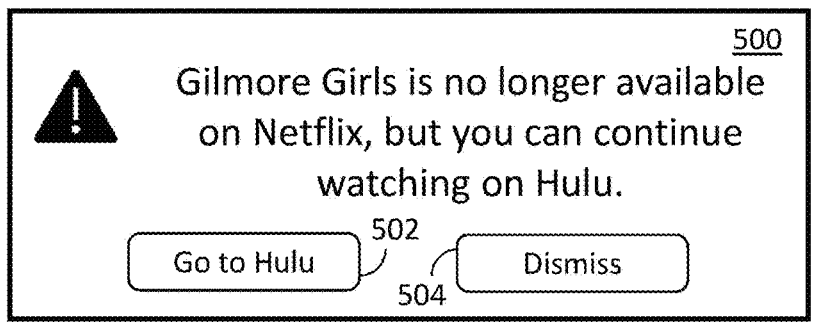
FIG. 5 shows an illustrative example of a notification generated by a media application that a content item is no longer available on a first media source but is available on a second media source, in accordance with some embodiments of the disclosure.

FIG. 5 shows an illustrative example of a notification generated by a media application that a content item is no longer available on a first media source but is available on a second media source, in accordance with some embodiments of the disclosure. The media application may detect that a content item or content series the user is currently consuming via a first media source is no longer available on the first media source. In response, the media application accesses availability data for the content item or content series on all available media sources. If the content item is determined to be available on a second media source, the media application generates an alert 500 notifying the user that the content item is no longer available on the first media source but is available on the second media source. For example, if the user is watching "Gilmore Girls" on Netflix, does not complete the series before it expires on Netflix (or it is determined that the user will not be able to complete the series before it expires on Netflix, such as by not adhering to the watch schedule), and it is determined that "Gilmore Girls" is also available on Hulu, alert 500 notifies the user that "'Gilmore Girls' is no longer available on Netflix, but you can continue watching on Hulu."

Alert 500 may include a button 502 that links the user to the second media source and a button 504 to dismiss alert 500. Button 502 may be a deep link to the content item or content series. For example, rather than linking the user to the Hulu homepage, a URL, URI, or other resource address is retrieved from Hulu for the content item or content series. A deep link is then generated that takes the user directly to that URL, URI, or resource address.

Figure 6:
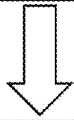
FIG. 6 shows an illustrative example of generating a compressed version of the series, in accordance with some embodiments of the disclosure.

FIG. 6 shows an illustrative example of generating a compressed version of the series, in accordance with some embodiments of the present disclosure. Content item 600 contains title card 602, recap 604, scenes 606, 608, 610, and 612, and credits 614. Title card 602, recap 604, and credits 614 do not form part of any storyline of content 600 and are therefore determined to be ancillary segments. To generate a compressed version of the content series 616, these ancillary segments are removed, leaving scenes 1-4 (606-612). Compressed content 616 thus contains only four segments 618-624, corresponding to Segments 3, 4, 5, and 6 of content 600.

Figure 7:
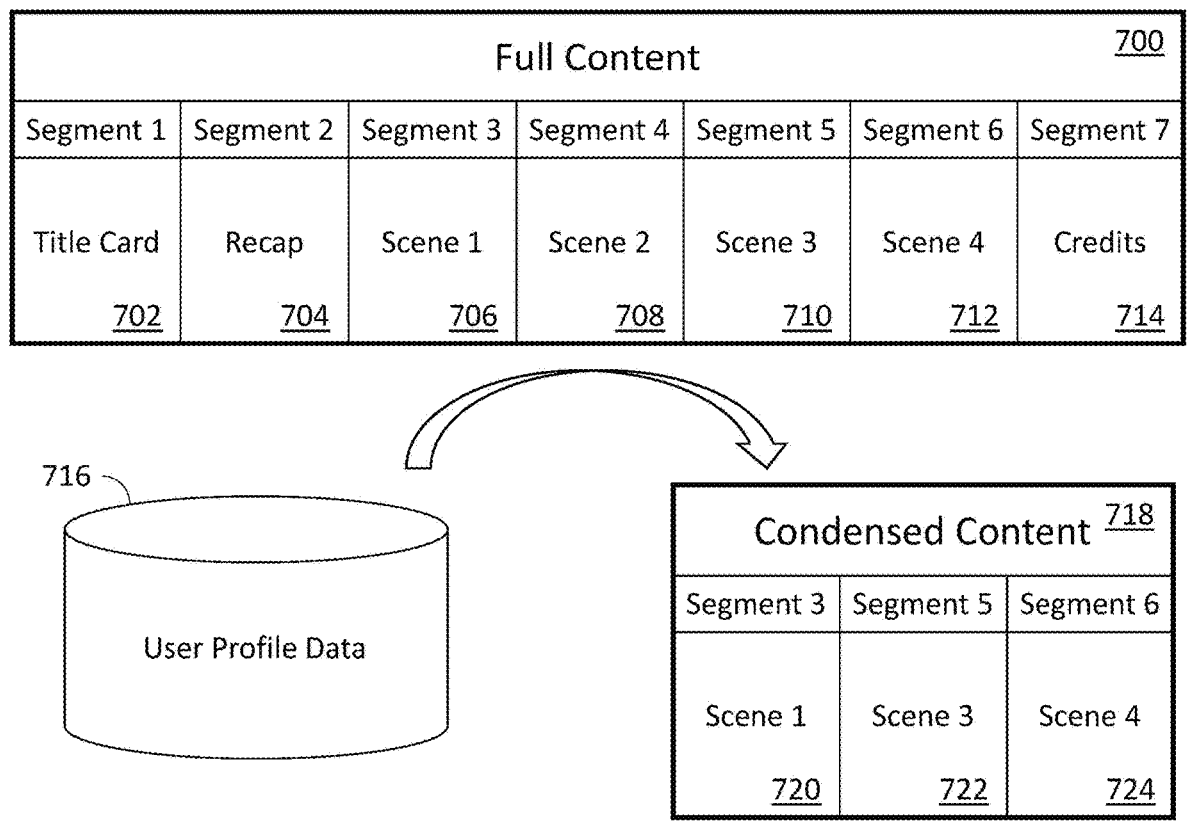
FIG. 7 shows an illustrative example of generating a compressed version of a content series based on user profile data, in accordance with some embodiments of the present disclosure.

FIG. 7 shows an illustrative example of generating a compressed version of a content series based on user profile data, in accordance with some embodiments of the present disclosure. Content 700 contains title card 702, recap 704, scenes 706, 708, 710, 712, and credits 714. If, after removing the ancillary segments 702, 704, and 714 (as described above in connection with FIG. 6), the item is still determined to be too long for the user to complete prior to expiration of the content series, then scenes determined not to be of interest to the user can also be removed. These scenes are selected by analyzing user profile data 716. For example, user profile data may indicate a user's preference for, or dislike of, a particular character or storyline. User profile data may include social media data, such as posts or comments made by the user that refer to characters or storylines in content items consumed by the user. Scenes may be chosen to be removed because they do not contain a favorite actor, character, location, genre, any other suitable preferred content characteristic, and/or any suitable combination thereof. For example, segment 708, corresponding to scene 2 of content 700, may be determined not to be of interest to the user and is therefore removed. Condensed content 718 thus contains no ancillary content (i.e., segments 702, 704, 714) and does not contain scene 2 (segment 708). Condensed content 718 contains only scenes 1, 3, and 4 (720, 722, and 724).

FIG. 8 shows an illustrative example of metadata for content items and content series, in accordance with some embodiments of the disclosure. Metadata 800 represents a first content item. Metadata 800 associates a number of data items with an identifier 802 of the first content item. In the example of FIG. 8, each content item is assigned a 12-digit hexadecimal identifier, though any other suitable type of identifier may be used. Data item 804 indicates the title of the content item. Data item 806 indicates the media sources on which the content item is available. In the example of FIG. 8, metadata 800 is associated with content having the title "Gilmore Girls" and is available on Netflix, Hulu, and Tubi. Data item 808 indicates that "Gilmore Girls" is a series of content items and not a single content item. Data item 810 indicates that "Gilmore Girls" is a television show rather than a movie or other type of content. Data items 812 and 814 represent the date and time at which the content item first became available and the date and time at which the content will expire, respectively, on each of the media sources on which the content item is available. In the example of FIG. 8, "Gilmore Girls" became available on Netflix at midnight UTC on Jan. 1, 2020, on Hulu at noon UTC on Jun. 1, 2019, and on Tubi at midnight UTC on May 15, 2021. "Gilmore Girls" will then expire on Netflix one second before midnight UTC on Dec. 31, 2021, on Hulu at midnight UTC on Sep. 30, 2021, and on Tubi at one second before midnight UTC on May 14, 2023. Finally, data item 816 indicates content identifiers of other members of the content series.

Metadata 818 represents a second content item, "Iron Man." Data item 820 includes only one source, Disney+, on which "Iron Man" is available. However, even though "Iron Man" is a movie, it is still part of a series (i.e., the Marvel Cinematic Universe) and therefore, data item 822 indicates that the content item is part of a series. Metadata 824 represents a third content item, "The Martian," which is a movie that is not related to any other content items. Therefore, data item 826 indicates that "The Martian" is not part of a series.

Figure 9:
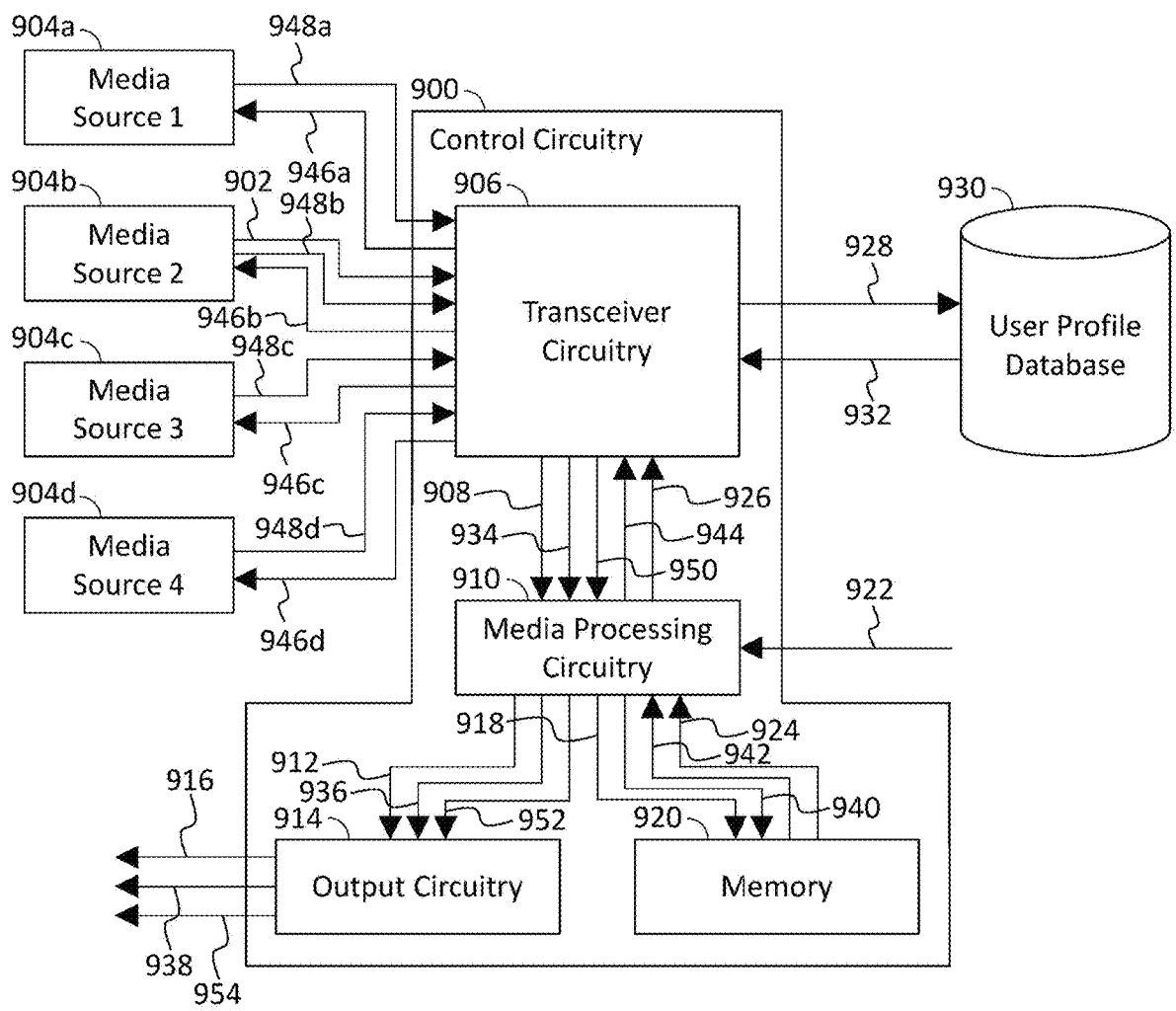
FIG. 9 is a block diagram showing components and dataflow therebetween of a system for generating watch schedules and compressed versions of content based on an upcoming expiration of content, in accordance with some embodiments of the disclosure.

FIG. 9 is a block diagram showing components and dataflow therebetween of a system for generating watch schedules and compressed versions of content based on an upcoming expiration of content, in accordance with some embodiments of the disclosure. Control circuitry 900 receives 902 availability data for one or more content items from a media source such as media source 2 904*b*. The availability data is received using transceiver circuitry 906.

Control circuitry 900 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Transceiver circuitry 906 may be a network connection such as an Ethernet port, WiFi module, or any other data connection suitable for communicating with a remote server.

The availability data received from media source 2 904*b* may be similar to the metadata described above in connection with FIG. 8. Alternatively or additionally, availability data may be received from each of media sources 1, 2, 3, and 4 (904*a*-904*d*). Availability data received from multiple media sources may be combined into a single dataset, database, or other data structure. In some embodiments, combined availability data may be received from a single remote source.

Transceiver circuitry 906 transmits 908 the received availability data to media processing circuitry 910. Media processing circuitry 910 compares the availability data with content items that the user is currently consuming to determine whether any content item or content series will expire soon. For example, media processing circuitry 910 determines, based on the availability data, that the content series "Gilmore Girls" will expire, on the media source on which the user is currently consuming the content series (e.g., Netflix), in seven days. Media processing circuitry 910 compares the amount of content remaining in the series to the amount of time remaining prior to expiration of the content series on the media source on which the user is consuming the content series. For example, media processing circuitry 910 may determine a number of episodes remaining, or a number of minutes of content remaining in the content series. The remaining number of episodes may be compared to an episode threshold such as the number of days remaining prior to expiration of the content series. Alternatively or additionally, the number of minutes remaining may be compared to a time threshold, which may be the product of a set number of minutes and the number of days remaining prior to expiration of the content series. If the remaining number of episodes exceeds the episode threshold or the number of minutes remaining exceeds the time threshold, media processing circuitry 910 generates a watch schedule for the user that, if adhered to, will allow the user to finish watch "Gilmore Girls" prior to its expiration.

Once the watch schedule has been generated, media processing circuitry 910 generates a notification to alert the user that the watch schedule has been created. Media processing circuitry 910 transmits 912 the notification to output circuitry 914, which in turn outputs 916 the notification to the user. Output circuitry 914 may be a display or speaker integrated into the same device in which control circuitry 900 is housed. Alternatively, output circuitry 914 may be any suitable audio or video data transmission module that drives the video or audio output of an external display or speaker. Output circuitry 914 may include any suitable wireless (e.g., Bluetooth, WiFi) or wired (e.g., USB, Ethernet) connection for communicating with an external display or speaker.

Media processing circuitry 910 also transmits 918 the watch schedule to memory 920 for storage in order to allow for later comparison of user consumption of the content series with the watch schedule. Memory 920 may be any device for storing electronic data, such as random-access memory, read-only memory, hard drives, optical drives, digital video recorders (DVRs, sometimes called personal video recorders, or PVRs), solid state devices, quantum storage devices, or any other suitable fixed or removable storage devices, and/or any combination of the same.

Media processing circuitry 910 monitors 922 user consumption of content. If the user is consuming content for which a watch schedule has been generated, media processing circuitry 910 retrieves 924, from memory 920, the watch schedule for the content the user is currently consuming. Media processing circuitry 910 compares the user's consumption of the content to the watch schedule to determine whether the user is adhering to the watch schedule. For example, a watch schedule may be generated for "Gilmore Girls." The watch schedule may advise the user to consume two episodes on one day of the schedule and three episodes on the next day of the schedule. When the user begins watching "Gilmore Girls" on the second day of the schedule, media processing circuitry 910 may determine the number of episodes the user consumed on the first day and compare it to the number of episodes advised by the watch schedule for the first day. If the number of episodes consumed is less than the number of episodes advised by the watch schedule, media processing circuitry 910 may determine to alter the watch schedule.

In some embodiments, media processing circuitry 910 may determine that a more aggressive watch schedule is still feasible for the user to complete and may therefore increase the number of episodes per day for the remainder of the watch schedule. However, a more aggressive watch schedule may not always be feasible. Media processing circuitry 910 may instead remove segments of content from one or more content items in the content series to create a compressed version of the content. For example, media processing circuitry 910 may identify ancillary segments of the content, including title cards, opening credits, closing credits, recaps, and other portions that either repeat in every episode or are unrelated to any storyline or plot point within the content series. Media processing circuitry 910 may also identify segments that are not of interest to the user. To do so, media processing circuitry 910 transmits 926 a request for user profile data to transceiver circuitry 906. Transceiver circuitry 906 in turn transmits 928 the request to user profile database 930. User profile database 930 may reside locally (e.g., in memory 920 or in another local storage device) or may reside on a remote server. In response to the request, transceiver circuitry 906 receives 932 user profile data of the user from user profile database 930 and in turn transmits 934 the user profile data to media processing circuitry 910.

User profile data may indicate preferences for different characters or storylines within the content series. For example, user profile data may include user watch history for content containing certain characters or storylines. If a user watched more content containing a first character than containing a second character, media processing circuitry 910 may determine that the user prefers the first character. This assumes the average amount of screen time for each character is the same. Media processing circuitry 910 may determine a relative amount of content by scaling the amount of content consumed by the user containing the first character by a factor corresponding to the amount of screen time that the first character receives and similarly scaling the amount of content consumed by the user containing the second character by a factor corresponding to the amount of screen time that the second character receives. User profile data may also include user watch history information regarding the amount of content normally consumed by the user on each day of the week. Media processing circuitry 910 may use this information to determine how much content the user will be able to consume on each day of the week when calculating the amount of content to advise the user to consume each day, or when determining the amount of content to remove from each content item when generating the compressed version of the content.

Once the compressed version of the content is generated, media processing circuitry 910 generates a notification to alert the user that they have fallen behind from the original watch schedule and that a compressed version of the content has been generated to enable them to complete watching the content series prior to its expiration. Media processing circuitry 910 transmits 936 the notification to output circuitry 914, which in turn outputs 938 the notification to the user. Media processing circuitry 910 also stores 940 the compressed version of the content, or a data structure indicating the segments that compose the compressed version of the content, in memory 920. During playback of each content item in the content series, media processing circuitry 910 may refer to the stored data structure to identify which segments of content to skip or remove from playback of the content item.

Media processing circuitry 910 continues to monitor 922 user consumption of content. If media processing circuitry 910 detects that the user is consuming content for which a compressed version has been generated, media processing circuitry 910 retrieves 942 from memory 920 the compressed version of the content or the data structure indicating which segments of the content are to be skipped or removed from playback. Media processing circuitry 910 also continues to compare user consumption of the content with the watch schedule and/or the expiration date of the content to determine whether the user will complete consumption of the content item or content series prior to its expiration.

If media processing circuitry 910 determines that the user will still not complete the content item or content series prior to its expiration, media processing circuitry 910 may identify other media sources on which the content item or content series is available. Media processing circuitry 910 may transmit 944 a request for availability information from each media source to transceiver circuitry 906. Transceiver circuitry 906 transmits 946a-946d the request to all available media sources (e.g., media sources 1-4 904a-904d). Each media source responds with its respective availability data which are received 948a-948d by transceiver circuitry 906 which in turn transmits 950 the availability data to media processing circuitry 910. Media processing circuitry 910 compares the expiration date of the content item or content series on each media source on which it is available. If the content item or content series is available with a later expiration date on a different media source than that on which the user is currently consuming the content item or content series, media processing circuitry 910 determines whether the user is subscribed to the different media source. For example, if the user is currently watching "Gilmore Girls" on Netflix and "Gilmore Girls" is also available with a later expiration date on Hulu, media processing circuitry 910 determines whether the user is subscribed to Hulu. Subscription information may be included in the user profile data.

If the user is subscribed to another media source on which the content item or content series is available with a later expiration date, media processing circuitry 910 generates a recommendation to the user to continue watching the content item or content series on the other media source. Media processing circuitry 910 may include in the recommendation a deep link to the content item on the other media source. The deep link may further include the time stamp at which the user last paused consumption of the content item or content series so that the deep link not only takes the user directly to the content item or content series, but also causes playback to begin at the last paused time stamp. If the user is not subscribed to any other media source on which the content item is available with a later expiration date, media processing circuitry 910 generates a recommendation to the user to subscribe to a media source on which the content item or content series is available with a later expiration date.

After generating a recommendation, media processing circuitry 910 transmits 952 the recommendation to output circuitry 914, which in turn outputs 954 the recommendation to the user. If the recommendation is to subscribe to another media source, and if media processing circuitry 910 detects that the user has completed the subscription process, media processing circuitry 910 may automatically forward the user, using a deep link, to the content item or content series on the newly subscribed media source.

Figure 10:
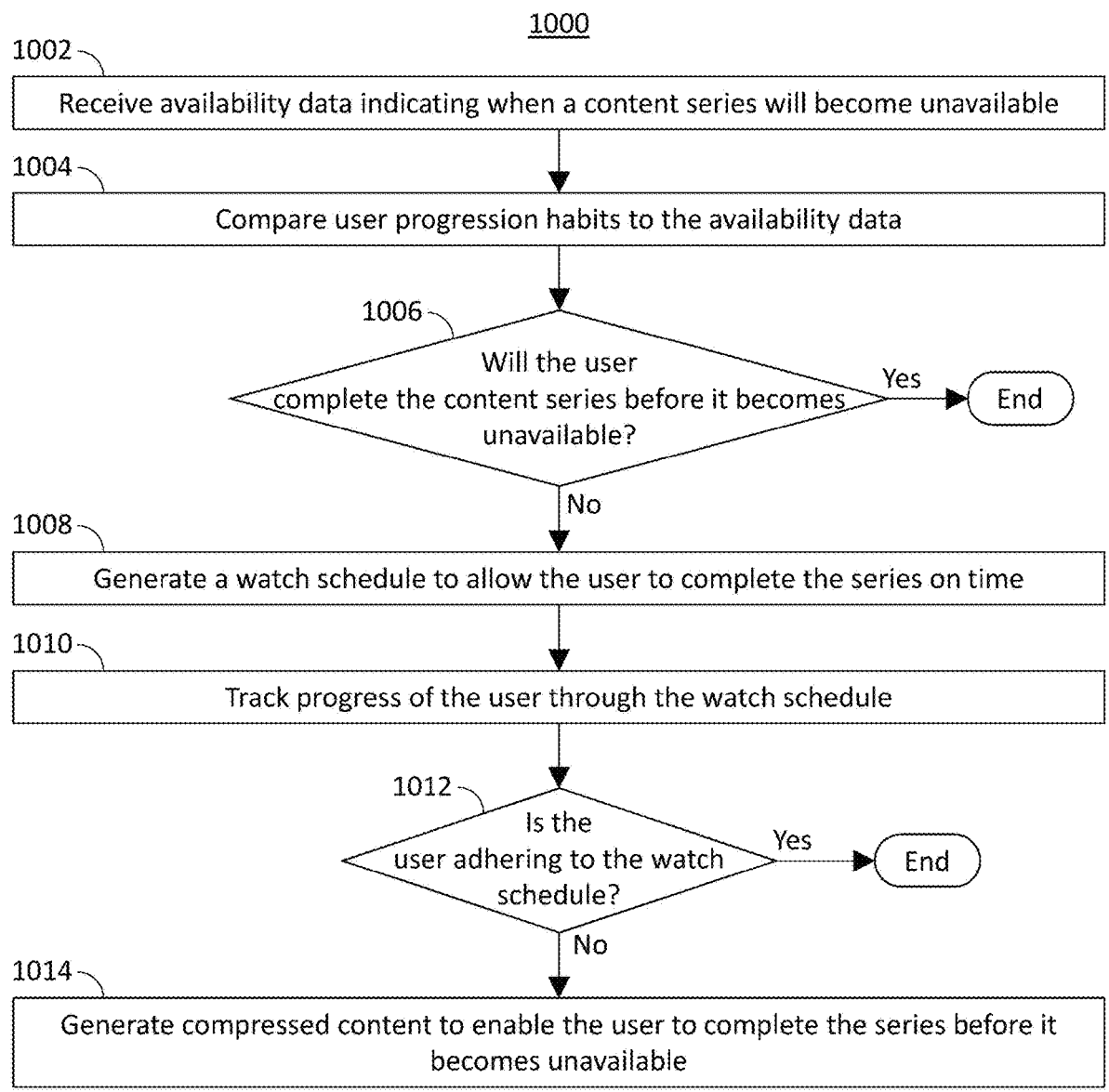
FIG. 10 is a flowchart representing an illustrative process for generating a watch schedule and compressed content to enable a user to complete a content series prior to expiration of the content series, in accordance with some embodiments of the disclosure.

FIG. 10 is a flowchart representing an illustrative process 1000 for generating a watch schedule and compressed content to enable a user to complete a content series prior to expiration of the content series by removing segments from content items in the content series, in accordance with some embodiments of the disclosure. Process 1000 may be implemented on control circuitry 900. In addition, one or more actions of process 1000 may be incorporated into or combined with one or more actions of any other process or embodiment described herein.

At 1002, control circuitry 900 receives availability data indicating when a content series will become unavailable. The availability data may be received from a media source or from a remote server at which availability data from multiple media sources is compiled in a centralized database. At 1004, control circuitry 900 compares user progression habits to the availability data. For example, user profile data is analyzed to determine how much content the user typically consumes each day. User progression habits may include when they typically consume content, how much content they consume at once, how frequently they consume content, any other suitable information about consumption habits, and/or any combination thereof. The amount of time needed for the user to complete consumption of the content series is extrapolated based on the user progression data and is added to the current date and time. The resulting projected time at which the user will complete consumption of the content series is then compared with the availability data. At 1006, control circuitry 900 determines whether the user will complete the series before it becomes unavailable. If the user will complete the content series before it becomes unavailable ("Yes" at 1006), the process ends. If the user will not complete the content series before it becomes unavailable ("No" at 1006), then, at 1008, control circuitry 900 generates a watch schedule to allow the user to complete the series on time. The watch schedule may be determined based on user progression habits, an even distribution of content across the remaining time prior to expiration of the content series, or any other suitable distribution of content over time.

If there are multiple content items the user is consuming for which a watch schedule must be generated, control circuitry 900 may give priority to content items whose associated metadata does not indicate any upcoming availability on any media source, and when such content items align with the user's recent viewing behavior on various platforms. For example, the user's recent consumption profile might show that the user has been watching various Marvel movies on different media source. For example, in the past three weeks, the user watched "Thor," "Ant-Man," and "Black Panther." The central service might prioritize other related movies (e.g., "Thor: Ragnarok," "Doctor Strange," etc.) over other movies on the user's watch list or the items on the user's recommendation list when it is unknown whether these movies will be available anytime soon through other media sources that the user utilizes often. Control circuitry 900 may give priority to content items expiring sooner than other content items expiring later. For example, if "Gilmore Girls" will expire in seven days and "Thor: Ragnarok" will expire in ten days, priority will be given to "Gilmore Girls" over "Thor: Ragnarok."

To give priority to one content item over another, control circuitry 900 may include in the watch schedule a greater amount of content or time for watching the prioritized content item and a lesser amount of content or time for watching other content items. If the user fails to adhere to the watch schedule and the amount of time needed to complete the earlier-expiring content item will leave no time for watching the later-expiring content item before its expiration, control circuitry 900 may generate a compressed version of one or more of the content items for which the watch schedule was generated.

At 1010, control circuitry 900 tracks progress of the user through the watch schedule. Control circuitry 900 monitors user consumption of the content series and compares the user's progress through the content series to the watch schedule. At 1012, control circuitry 900 determines whether the user is adhering to the watch schedule. For example, if comparison of the user's progress to the watch schedule shows that the user has not consumed the recommended amount of content in the last day, it may be determined that the user is not adhering to the watch schedule. Control circuitry 900 may allow a threshold deviation from the recommended amount of content before determining that the user has not adhered to the watch schedule. For example, control circuitry 900 may consider consumption of 95% of the recommended amount of content as having consumed the recommended amount of content. Thus, if the watch schedule recommends that the user consume thirty minutes of content in a day and the user actually consumes twenty eight and a half minutes of content, then control circuitry 900 may consider the user to have adhered to the watch schedule.

If the user is not adhering to the watch schedule ("No" at 1012), then, at 1014, control circuitry 900 generates a compressed version of the content series to enable the user to complete it before it becomes unavailable. This may be accomplished using methods described above in connection with FIGS. 6-7 or below in connection with FIG. 11.

The actions or descriptions of FIG. 10 may be used with any other embodiment of this disclosure. In addition, the actions and descriptions described in related to FIG. 10 may be done in suitable alternative orders or in parallel to further the purposes of this disclosure.

Figure 11:
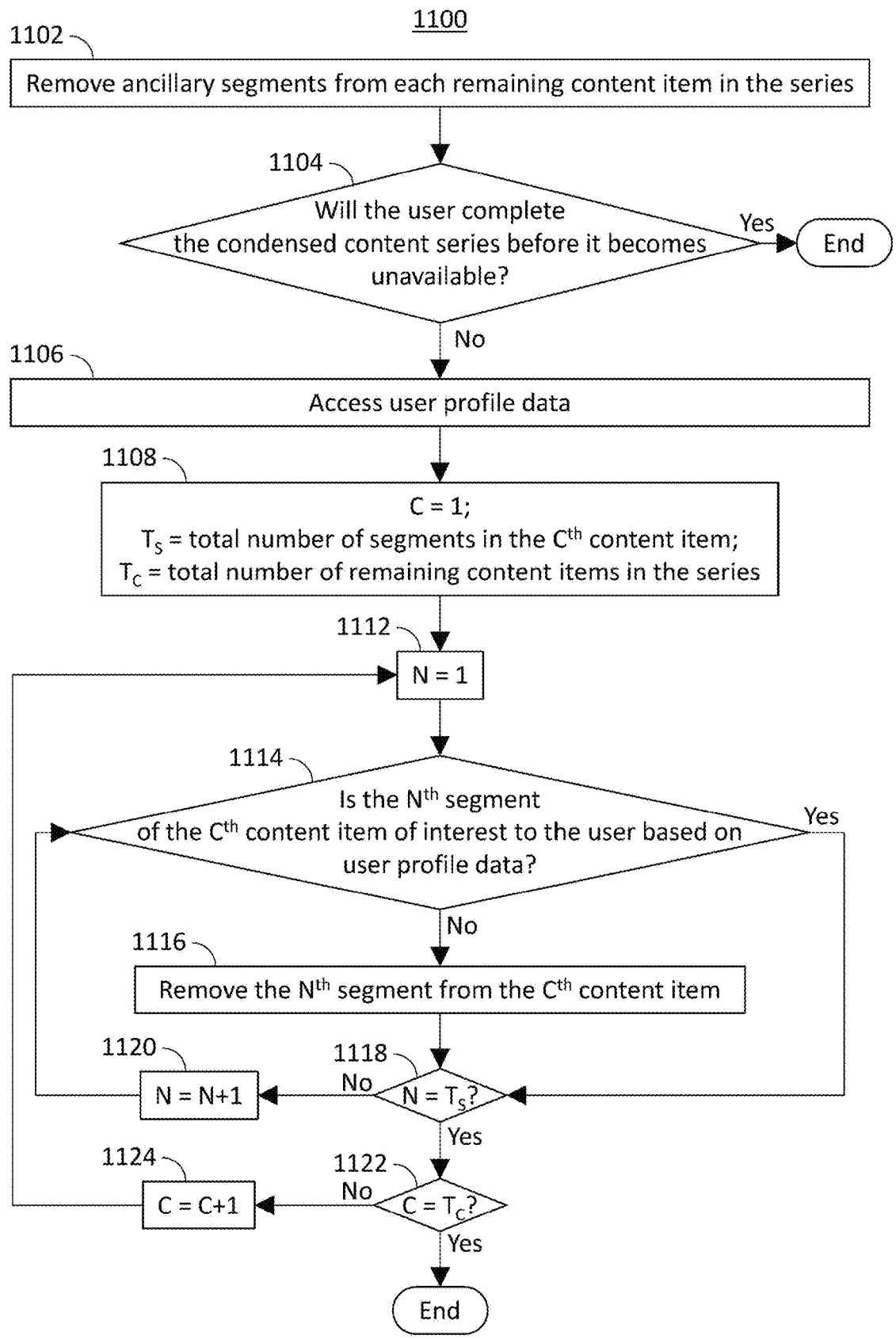
FIG. 11 is a flowchart representing an illustrative process for generating a compressed version of a content series by removing segments from content items in the content series, in accordance with some embodiments of the disclosure.

FIG. 11 is a flowchart representing an illustrative process 1100 for generating a compressed version of a content series by removing segments from content items in the content series, in accordance with some embodiments of the disclosure. Process 1100 may be implemented on control circuitry 900. In addition, one or more actions of process 1100 may be incorporated into or combined with one or more actions of any other process or embodiment described herein.

If it is determined that a user is not adhering to the provided watch schedule, then, at 1102, control circuitry 900 removes ancillary segments from each remaining content item in the content series. Control circuitry 900 may access or retrieve metadata of the content item indicating segment types for each segment of each content item. If a segment is indicated to contain media content that is not relevant to the overall storyline or plot of the content item, such as title cards, opening credits, closing credits, and recaps, Control circuitry 900 determines those segments to be ancillary segments and removes them from each content item in the content series. At 1104, control circuitry 900 determines whether the user will complete the compressed content series before it becomes unavailable. This may be accomplished using methods described above in connection with FIG. 10. If the user will complete the compressed content series before it becomes unavailable ("Yes" at 1104), the process ends. If the user will not complete the compressed content series before it becomes unavailable ("No" at 1104), then, at 1106, control circuitry 900 accesses user profile data indicating characters, plots, storylines, and the like that are of interest to the user. Control circuitry 900 may access user profile data that is stored locally, such as in memory 920, or at a remote server or database such as user profile database 930.

At 1108, control circuitry 900 initializes a counter variable C, setting its value to one, a variable $T_S$ representing the total number of segments in the $C^{th}$ content item, and a variable $T_C$ representing the total number of remaining content items in the content series. At 1112, control circuitry 900 initializes a second counter variable N, setting its value to one. Then, at 1114, control circuitry 900 determines whether the $N^{th}$ segment of the $C^{th}$ content item is of interest to the user based on the user profile data. For example, metadata of the $N^{th}$ segment may indicate the presence of a given character. Control circuitry 900 compares the given character with characters known to be of interest to the user based on the user profile data. If the user profile data does not indicate that the given character is of interest to the user, or if the user profile data indicates a disinterest in the given character, control circuitry 900 determines that the segment is not of interest to the user.

If the $N^{th}$ segment of the $C^{th}$ content item is not of interest to the user ("No" at 1114), then, at 1116, control circuitry 900 removes the $N^{th}$ segment from the $C^{th}$ content item. After removing the $N^{th}$ segment, or if the $N^{th}$ segment is determined to be of interest to the user ("Yes" at 1014), at 1118, control circuitry 900 determines whether N is equal to $T_S$, meaning that all segments of the $C^{th}$ content item have been processed. If N is not equal to $T_S$ ("No" at 1118), then, at 1120, control circuitry 900 increments the value of N by one and processing returns to 1114. If N is equal to $T_S$ ("Yes" at 1118), then, at 1122, control circuitry 900 determines whether C is equal to $T_C$, meaning that all remaining content items in the content series have been processed. If C is not equal to $T_C$ ("No" at 1122), then, at 1124, control circuitry 900 increments the value of C by one and processing returns to 1112, where the value of N is reset to one and the segments of the next content item in the content series can be processed. If C is equal to $T_C$, meaning that all content items in the content series have been processed ("Yes" at 1122), the process ends.

The actions or descriptions of FIG. 11 may be used with any other embodiment of this disclosure. In addition, the actions and descriptions described in related to FIG. 11 may be done in suitable alternative orders or in parallel to further the purposes of this disclosure.

Figure 12:
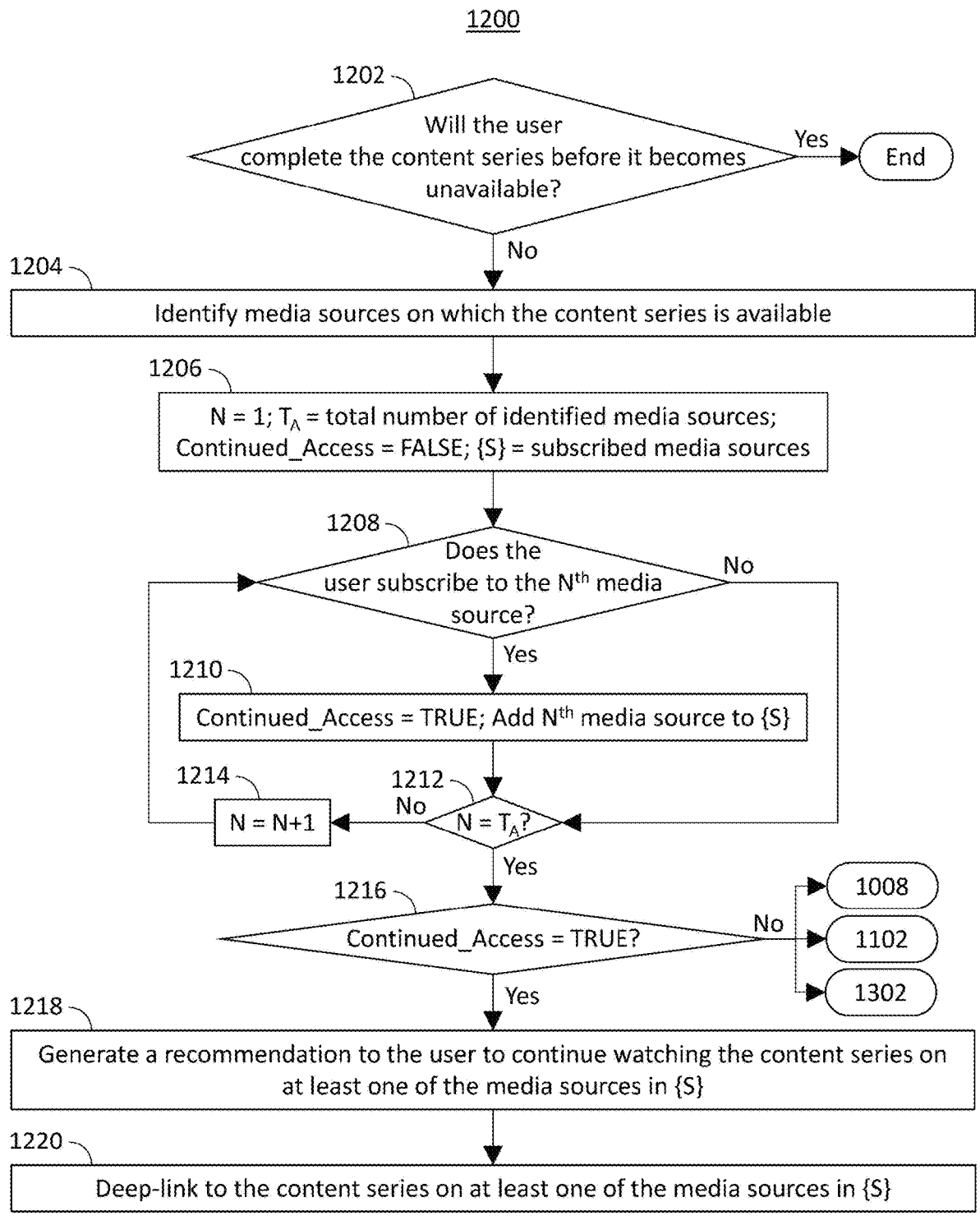
FIG. 12 is a flowchart representing an illustrative process for determining whether a user will continue to have access to the content series on another media source, in accordance with some embodiments of the disclosure.

FIG. 12 is a flowchart representing an illustrative process 1200 for determining whether a user will continue to have access to the content series on another media source, in accordance with some embodiments of the disclosure. Process 1200 may be implemented on control circuitry 900. In addition, one or more actions of process 1200 may be incorporated into or combined with one or more actions of any other process or embodiment described herein.

At 1202, control circuitry 900 determines whether the user will complete the content series before it becomes unavailable. This may be accomplished using methods described above in connection with FIG. 10. If the user will complete the content series before it becomes unavailable ("Yes" at 1202), the process ends. If the user will not complete the content series before it becomes unavailable ("No" at 1202), then, at 1204, control circuitry 900 identifies media sources on which the content series is available. For example, the availability data may include information about which media sources have the content series available.

At 1206, control circuitry 900 initializes a counter variable N, setting its value to one, a variable $T_A$ representing the total number of identified media sources on which the content series is available, a flag or Boolean variable Continued_Access, setting its value to FALSE, and an array or other data structure {S} in which identifiers of media sources to which the user subscribes can be stored. At 1208, control circuitry 900 determines whether the user subscribes to the $N^{th}$ media source. For example, user profile data may include information regarding user subscriptions to media sources. If the user subscribes to the $N^{th}$ media source ("Yes" at 1208), then, at 1210, control circuitry 900 sets the value of the Continued_Access flag to TRUE and adds an identifier of the $N^{th}$ media source to {S}. After setting the flag value, or if the user does not subscribe to the $N^{th}$ media source ("No" at 1208), at 1212, control circuitry 900 determines whether N is equal to $T_A$, meaning that the user's subscription status for all identified media sources has been determined. If N is not equal to $T_A$ ("No" at 1212), then, at 1214, control circuitry 900 increments the value of N by one and processing returns to 1208.

If N is equal to $T_A$ ("Yes" at 1212), then, at 1216, control circuitry 900 determines whether the value of the Continued_Access flag is TRUE. If so ("Yes" at 1216), then, at 1218, control circuitry 900 generates a recommendation to the user to continue watching the content series on at least one of the media sources identified in {S}. In some embodiments, if more than one media source is identified in {S}, control circuitry 900 may determine, based on user consumption history, a preference of the user for one media source over another and recommend that the user continue watching the content series on the preferred media source. At 1220, control circuitry 900 deep-links to the content series on at least one of the media sources identified in {S}. Deep-linking is described above in connection with FIG. 9. If the value of the Continued_Access flag is FALSE, meaning that the user will not continue to have access on any other subscribed media source after expiration of the content series on the media source on which the user is currently consuming the content series ("No" at 1216), then processing proceeds to either 1008, at which control circuitry 900 generates a watch schedule; 1102, at which control circuitry 900 removes segments from the content; or 1304 at which, as described below in connection with FIG. 13, control circuitry 900 recommends to the user to subscribe to one of the media sources on which the content series is available.

The actions or descriptions of FIG. 12 may be used with any other embodiment of this disclosure. In addition, the actions and descriptions described in related to FIG. 12 may be done in suitable alternative orders or in parallel to further the purposes of this disclosure.

Figure 13:
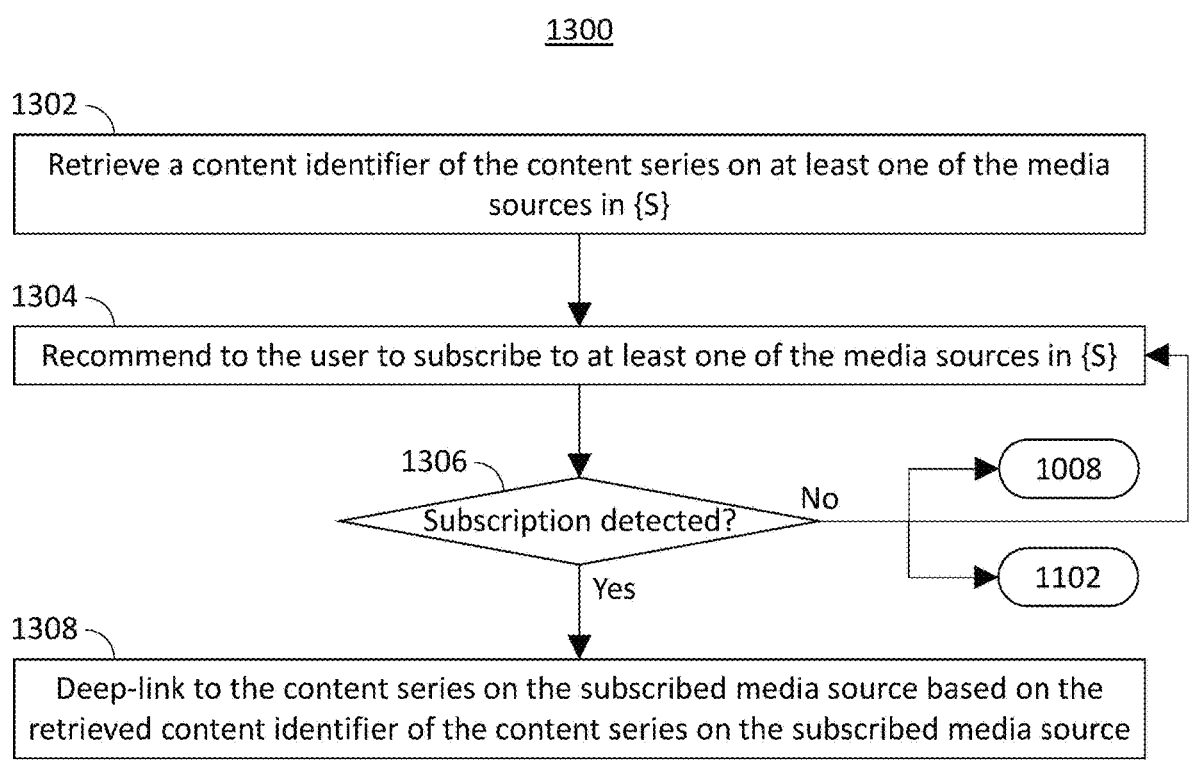
FIG. 13 is a flowchart representing an illustrative process for deep-linking to the content series on another media source after a user has subscribed to the other media source, in accordance with some embodiments of the disclosure.

FIG. 13 is a flowchart representing an illustrative process 1300 for deep-linking to the content series on another media source after a user has subscribed to the other media source, in accordance with some embodiments of the disclosure. Process 1300 may be implemented on control circuitry 900. In addition, one or more actions of process 1300 may be incorporated into or combined with one or more actions of any other process or embodiment described herein.

At 1302, control circuitry 900 retrieves a content identifier of the content series on at least one of the media sources identified in {S}. Control circuitry 900 may access the at least one media source and request a content identifier of the content series. In some embodiments, the availability data may include content identifiers for each content item on each media source on which the respective content item is available. At 1304, control circuitry 900 recommends to the user to subscribe to at least one of the media sources in {S}. Control circuitry 900 may generate for output to the user a link to subscribe to the at least one media source. At 1306, control circuitry 900 determines whether the user has subscribed to the at least one media source. For example, control circuitry 900 may monitor user interaction with the subscription link or a live-updated list of media sources to which the user subscribes. If a subscription is detected ("Yes" at 1306), then, at 1308, control circuitry 900 deep-links the user to the content series on the subscribed media source based on the retrieved content identifier of the content series on the subscribed media source. If no subscription is detected ("No" at 1306), control circuitry may continue to recommend a subscription to one or more media sources, with processing returning to 1304. Alternatively, if control circuitry 900 has not already done so, processing may proceed to either 1008, at which a watch schedule can be generated, or to 1102, at which segments can be removed from the content.

The actions or descriptions of FIG. 13 may be used with any other embodiment of this disclosure. In addition, the actions and descriptions described in related to FIG. 13 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving availability data indicating an expiration date when a content item will become unavailable;
   generating a watch schedule that will allow a user to complete the content item before the expiration date, the watch schedule comprising a rate at which to consume the content item; and
   in response to determining that the user will not complete the content item before the expiration date, updating the watch schedule by increasing the rate at which to consume the content item.

2. The method of claim 1, wherein the determining that the user will not complete the content item before the expiration date comprises comparing user progression habits to the availability data.

3. The method of claim 1, wherein increasing the rate at which to consume the content item is based on the expiration date and user progression habits.

4. The method of claim 1, further comprising:
   determining that a user has consumed a portion of the content item; and
   determining that an unconsumed remainder of the content item is less than a threshold length of time; and
   wherein updating the watch schedule further comprises allocating additional time to consume the unconsumed remainder of the content item.

5. The method of claim 1, further comprising:
   generating a compressed version of the content item; and
   wherein updating the watch schedule further comprises replacing the content item with the compressed version of the content item.

6. The method of claim 1, wherein updating the watch schedule further comprises removing at least one ancillary segment from the content item.

7. The method of claim 1, further comprising:
   identifying, based on user profile data, at least one segment not of interest to the user from the content item; and
   wherein updating the watch schedule further comprises removing the at least one segment not of interest to the user from the content item.

8. The method of claim 1, further comprising:
   determining that a current source supports auto-skip of a segment type of the content item; and
   wherein updating the watch schedule further comprises removing at least a segment having the segment type from the content item.

9. The method of claim 1, wherein the availability data further indicates the expiration date when the content item will become unavailable from a current source of the content item.

10. The method of claim 9, further comprising:
    receiving availability data indicating that a content series is available from a second source after the expiration date; and
    recommending to the user to continue watching the content series on the second source.

11. A system comprising:
    output circuitry; and
    control circuitry configured to:
    receive availability data indicating an expiration date when a content item will become unavailable;
    generate a watch schedule that will allow a user to complete the content item before the expiration date, the watch schedule comprising a rate at which to consume the content item; and
    in response to determining that the user will not complete the content item before the expiration date, update the watch schedule by increasing the rate at which to consume the content item.

12. The system of claim 11 wherein the control circuitry is further configured to, when determining that the user will not complete the content item before the expiration date, compare user progression habits to the availability data.

13. The system of claim 11 wherein the control circuitry is further configured to increase the rate at which to consume the content item based on the expiration date and user progression habits.

14. The system of claim 11 wherein the control circuitry is further configured to:
    determine that a user has consumed a portion of the content item; and
    determine that an unconsumed remainder of the content item is less than a threshold length of time; and
    when updating the watch schedule, allocate additional time to consume the unconsumed remainder of the content item.

15. The system of claim 11 wherein the control circuitry is further configured to:
    generate a compressed version of the content item; and
    when updating the watch schedule, replace the content item with the compressed version of the content item.

16. The system of claim 11 wherein the control circuitry is further configured to, when updating the watch schedule, remove at least one ancillary segment from the content item.

17. The system of claim 11 wherein the control circuitry is further configured to:
    identify, based on user profile data, at least one segment not of interest to the user from the content item; and
    when updating the watch schedule, remove the at least one segment not of interest to the user from the content item.

18. The system of claim 11 wherein the control circuitry is further configured to:
   determine that a current source supports auto-skip of a segment type of the content item; and
   when updating the watch schedule, remove at least a segment having the segment type from the content item.

19. The system of claim 11 wherein the availability data indicates the expiration date when the content item will become unavailable from a current source of the content item.

20. The system of claim 19 wherein the control circuitry is further configured to:
   receive availability data indicating that a content series is available from a second source after the expiration date; and
   recommend to the user to continue watching the content series on the second source.

\* \* \* \* \*